(12) United States Patent
Matsuoka

(10) Patent No.: US 8,451,882 B2
(45) Date of Patent: May 28, 2013

(54) OFDM MODULATION/DEMODULATION METHOD, OFDM MODULATION DEVICE, OFDM DEMODULATION DEVICE, AND OFDM MODULATION/DEMODULATION SYSTEM

(75) Inventor: Hosei Matsuoka, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 163 days.

(21) Appl. No.: 13/055,094

(22) PCT Filed: Jul. 17, 2009

(86) PCT No.: PCT/JP2009/062978
§ 371 (c)(1),
(2), (4) Date: Jan. 20, 2011

(87) PCT Pub. No.: WO2010/032548
PCT Pub. Date: Mar. 25, 2010

(65) Prior Publication Data
US 2011/0122959 A1    May 26, 2011

(30) Foreign Application Priority Data
Sep. 17, 2008   (JP) .................................. 2008-238210

(51) Int. Cl.
*H04L 5/16*   (2006.01)
*H04B 1/38*   (2006.01)
*H03D 1/04*   (2006.01)

(52) U.S. Cl.
USPC ........................................ 375/222; 375/346

(58) Field of Classification Search
USPC ................................ 704/200.1; 375/222, 346
See application file for complete search history.

(56) References Cited

U.S. PATENT DOCUMENTS

| | | | |
|---|---|---|---|
| 6,219,634 B1 * | 4/2001 | Levine | 704/200.1 |
| 6,526,385 B1 * | 2/2003 | Kobayashi et al. | 704/504 |
| 6,545,997 B1 | 4/2003 | Bohnke et al. | |
| 8,208,522 B2 * | 6/2012 | Tupala et al. | 375/226 |

(Continued)

FOREIGN PATENT DOCUMENTS

| | | |
|---|---|---|
| CN | 101218768 A | 7/2008 |
| JP | 2000 68975 | 3/2000 |

(Continued)

OTHER PUBLICATIONS

Nakashima et al., "Evaluation and Demonstration of Acoustic OFDM", Nov. 1, 2006, Fortieth Asilomar Conference on Signals, Systems and Computers, ACSSC '06, pp. 1747-1751.*

(Continued)

*Primary Examiner* — David C. Payne
*Assistant Examiner* — Michelle M Koeth
(74) *Attorney, Agent, or Firm* — Oblon, Spivak, McClelland, Maier & Neustadt, L.L.P.

(57) ABSTRACT

An OFDM modulation/demodulation method in a transmission system that transmits data from a transmission source to a transmitting destination through OFDM modulation/demodulation is provided, which includes an extension step of extending, by the transmission source, a symbol period by copying an OFDM-modulated symbol in a predetermined place of the OFDM-modulated symbol for a predetermined length; a transmission step of transmitting, by the transmission source, the OFDM-modulated symbol that includes the extended symbol period to the transmitting destination; a demodulation performance step of receiving, by the transmitting destination, the OFDM-modulated symbol from the transmission source and performing OFDM demodulation of the received OFDM-modulated symbol from a plurality of time points; and a selection step of selecting, by the transmitting destination, the demodulation result of the OFDM demodulation to be adopted on the basis of the demodulation results of the OFDM demodulation from the plurality of time points.

6 Claims, 8 Drawing Sheets

U.S. PATENT DOCUMENTS

| | | | | |
|---|---|---|---|---|
| 2004/0066802 | A1* | 4/2004 | Ro et al. | 370/528 |
| 2004/0081073 | A1* | 4/2004 | Walton et al. | 370/204 |
| 2005/0276339 | A1* | 12/2005 | Chow et al. | 375/260 |
| 2006/0008017 | A1* | 1/2006 | Balakrishnan et al. | 375/260 |
| 2006/0114814 | A1* | 6/2006 | Kasami et al. | 370/208 |
| 2006/0166634 | A1* | 7/2006 | Ido | 455/277.1 |
| 2008/0243491 | A1* | 10/2008 | Matsuoka | 704/201 |
| 2009/0137230 | A1* | 5/2009 | Miyoshi et al. | 455/414.1 |
| 2009/0239484 | A1* | 9/2009 | Miyoshi et al. | 455/91 |
| 2011/0080967 | A1* | 4/2011 | Larsson et al. | 375/260 |
| 2011/0158342 | A1* | 6/2011 | Srinivasan et al. | 375/285 |

FOREIGN PATENT DOCUMENTS

| | | | |
|---|---|---|---|
| JP | 2000 196861 | | 7/2000 |
| JP | 2004 56552 | | 2/2004 |
| JP | 2007 104598 | | 4/2007 |
| JP | 2008 306477 | | 12/2008 |
| WO | WO2007/043376 | * | 4/2007 |

OTHER PUBLICATIONS

Matsuoka et al., "Acoustic OFDM: Embedding High Bit-Rate Data in Audio", 2007, Advances in Multimedia Modeling, pp. 498-507.*

Matsuoka et al., "Acoustic Communication With OFDM Signal Embedded in Audio", Sep. 4, 2006, The Proceedings of the AES 29th International Conference, Seoul, Korea, pp. 149-154.*

Matsuoka, H. et al. "Non Symbol Synchronization Scheme in Acoustic OFDM", B-8-10, Proceedings of the 2009 IEICE General Conference, Tsushin 2, p. 276, (Mar. 4, 2009) (with English translation).

Matsuoka, H. et al. "Aerial Acoustic Communications in Audible Band Acoustic OFDM", IEICE Technical Report, EA2006-24, vol. 106, No. 125, pp. 25-29, (Jun. 16, 2006) (with English translation).

International Search Report issued Aug. 25, 2009 in PCT/JP09/062978 filed Jul. 17, 2009.

Office Action issued Aug. 18, 2009, in Japanese Patent Application No. P2009-174123, filed Jul. 27, 2009 (with English-language Translation).

Final Rejection issued Nov. 10, 2009, in Japanese Patent Application No. P2009-174123 (with English-language Translation).

Notice of Allowance issued Apr. 6, 2010 in Japanese Patent Application No. P2009-174123 (with English-language Translation).

International Preliminary Report on Patentability issued Apr. 28, 2011 in PCT/JP2009/062978.

Japanese Office Action issued on Jun. 19, 2012, in patent Application No. 2008-238210 with English Translation.

Office Action issued on Apr. 3, 2013 in Chinese Patent Application No. 200980133714.7 and its English translation.

Extended European Search Report issued on Mar. 25, 2013 in European Patent Application No. 09814393.6.

* cited by examiner

US 8,451,882 B2

OFDM MODULATION/DEMODULATION METHOD, OFDM MODULATION DEVICE, OFDM DEMODULATION DEVICE, AND OFDM MODULATION/DEMODULATION SYSTEM

TECHNICAL FIELD

The present invention relates to an OFDM modulation/demodulation method, an OFDM modulation device, an OFDM demodulation device, and an OFDM modulation/demodulation system, which adopt technology for synchronizing symbols in an OFDM modulation/demodulation scheme.

BACKGROUND ART

As a wireless communication modulation/demodulation scheme, there is an OFDM (Orthogonal Frequency Division Multiplexing) modulation/demodulation scheme that is widely used in digital broadcasting or wireless LAN. This OFDM modulation/demodulation scheme has the characteristics that it has good frequency use efficiency through dense arrangement of sub-carriers by orthogonal frequencies, and is strong against frequency selective fading or reflected waves, and thus the use of the OFDM modulation/demodulation scheme in the next generation mobile communication has been examined.

In transmitting data in an OFDM modulation/demodulation scheme, it is necessary for a transmitting destination (receiving side) to detect a boundary of OFDM symbols in order to demodulate an OFDM-modulated signal. As a method of detecting a boundary of OFDM symbols, there is a method of detecting the boundary based on a correlation between a guard time and an OFDM-modulated signal. However, if delay waves exist due to reflection or the like, the detection accuracy is degraded, and thus in many cases, a transmission source (transmitting side) adds a signal for symbol synchronization to a transmitted audio signal.

In Patent Literature 1 described below, a data transmission system that makes data overlap an audio signal by applying the OFDM modulation/demodulation scheme to the audio signal is described. In the same manner as the wireless communication OFDM modulation/demodulation, the transmission system makes an OFDM-modulated signal and a signal for symbol synchronization overlap the audio signal. However, since the available frequency band is narrow, the system diffuses the signal for symbol synchronization and makes the diffused signal for symbol synchronization overlap the same frequency band as the audio signal.

Citation List
Patent Literature
Patent Literature 1: Japanese Patent Application Laid-open Gazette 2007-104598A

SUMMARY OF INVENTION

Technical Problem

However, in the transmission system described in the Patent Literature 1, it may be difficult to detect a signal for symbol synchronization due to surrounding noise or sound, and in this case, there is a concern that the symbol synchronization may fail, thereby making it impossible to demodulate the OFDM-modulated signal.

In consideration of the above subject, an object of the present invention is to provide an OFDM modulation/demodulation method, an OFDM modulation device, an OFDM demodulation device, and an OFDM modulation/demodulation system, which can perform an OFDM demodulation without the necessity of symbol synchronization.

Solution To Problem

An OFDM modulation/demodulation method according to the present invention may be described as follows, and a plurality of processing steps that constitute the OFDM modulation/demodulation method may be illustrated as in FIG. 7. That is, the present invention provides an OFDM modulation/demodulation method in a transmission system that transmits data from a transmission source to a transmitting destination through OFDM modulation/demodulation, which includes an extension step (step S1 of FIG. 7) of extending, by the transmission source, a symbol period by copying an OFDM-modulated symbol in a predetermined place of the OFDM-modulated symbol for a predetermined length; a transmission step (step S2 of FIG. 7) of transmitting, by the transmission source, the OFDM-modulated symbol that includes the extended symbol period to the transmitting destination; a demodulation performance step (step S3 of FIG. 7) of receiving, by the transmitting destination, the OFDM-modulated symbol from the transmission source and performing OFDM demodulation of the received OFDM-modulated symbol from a plurality of time points; and a selection step (step S4 of FIG. 7) of selecting, by the transmitting destination, the demodulation result of the OFDM demodulation to be adopted on the basis of the demodulation results of the OFDM demodulation from the plurality of time points.

Also, an OFDM modulation/demodulation method according to the present invention may be described as follows. The present invention provides an OFDM modulation/demodulation method in a transmission system that transmits data from a transmission source to a transmitting destination through OFDM modulation/demodulation, which includes an extension step (step S1 of FIG. 7) of extending, by the transmission source, a symbol period by copying an OFDM-modulated symbol in a predetermined place of the OFDM-modulated symbol for a predetermined length; a transmission step (step S2 of FIG. 7) of transmitting, by the transmission source, the OFDM-modulated symbol that includes the extended symbol period to the transmitting destination; a demodulation performance step (step S3 of FIG. 7) of receiving, by the transmitting destination, the OFDM-modulated symbol from the transmission source and performing OFDM demodulation of the received OFDM-modulated symbol from a plurality of time points; a determination step (step S41 of FIG. 7) of determining, by the transmitting destination, whether or not the demodulation has been normally performed with respect to the OFDM demodulations from the plurality of time points; and a result selection step (step S42 of FIG. 7) of selecting, by the transmitting destination, the demodulation result of the OFDM demodulation which is determined to have been normally performed as the demodulation result of the OFDM demodulation to be adopted.

In the OFDM modulation/demodulation method according to the present invention, it is preferable that a length of a copy of the OFDM-modulated symbol in the extension step is a length that is obtained by adding a symbol length and a guard time together in the OFDM modulation, and a time interval for performing the OFDM demodulation in the demodulation performance step is a length that is obtained by adding the symbol length and the guard time together in the OFDM modulation.

Also, it is preferable that the transmission system to which the OFDM modulation/demodulation method according to the present invention is applied is a system that transmits the OFDM-modulated data together with an audio signal by making the OFDM-modulated data overlap the audio signal.

Also, the present invention may be described as follows as an invention of an OFDM modulation device and an invention of an OFDM demodulation device.

The present invention provides an OFDM modulation device that is installed in a transmission source to perform OFDM modulation in a transmission system that transmits data from the transmission source to a transmitting destination through OFDM modulation/demodulation, which includes an extension means for extending a symbol period by copying an OFDM-modulated symbol in a predetermined place of the OFDM-modulated symbol for a predetermined length; and a transmission means for transmitting the OFDM-modulated symbol that includes the symbol period extended by the extension means to the transmitting destination.

It is preferable that a length of a copy of the OFDM-modulated symbol that is performed by the extension means is a length that is obtained by adding a symbol length and a guard time together in the OFDM modulation. Also, it is preferable that the transmission system is a system that transmits the OFDM-modulated data together with an audio signal by making the OFDM-modulated data overlap the audio signal.

Also, in more detail, an OFDM modulation device according to the present invention may be described as follows. That is, the present invention provides an OFDM modulation device, which includes a serial-parallel conversion unit for converting an encoded transmission signal of an input single bitstream into a parallel bitstream; a spectrum envelope amplitude adjustment unit for analyzing a spectrum of an input audio signal and adjusting amplitudes of respective sub-carriers to be modulated based on the analysis result; a data symbol forming unit for modulating the respective sub-carriers after the amplitude adjustment performed by the spectrum envelope amplitude adjustment unit by allocating parallel transmission bits, which have been converted into the parallel bitstream by the serial-parallel conversion unit, as spectrum coefficients of frequencies of the respective sub-carriers and performing an inverse Fourier transform of the parallel transmission bits, and forming a data symbol by synthesizing signals of the respective sub-carriers after modulation; a guard time signal generation unit for generating a guard time signal composed of a guard time and the data symbol by copying a predetermined period of the rear of the data symbol formed by the data symbol forming unit and connecting the copied period to the front of the data symbol as the guard time; a data symbol copy generation unit for extending a symbol period in the guard time signal generated by the guard time signal generation unit by copying the data symbol to be as long as a length that is obtained by adding the guard time and the data symbol length and connecting the copied data symbol to the rear of the corresponding guard time signal; a band-pass filter for removing an OFDM frequency band with respect to the audio signal and outputting the audio signal after removing the OFDM frequency band; an adder for performing synthesis by adding the audio signal after removing the OFDM frequency band by the band-pass filter to the signal in which the symbol period has been extended; and a D/A conversion unit (Digital-Analog conversion unit) for converting the signal after the synthesis performed by the adder into an analog signal and outputting the analog signal as a synthesized audio signal.

The present invention provides an OFDM demodulation device that is installed in a transmitting destination to perform OFDM demodulation in a transmission system that transmits data from a transmission source to the transmitting destination through OFDM modulation/demodulation, which includes a demodulation performance means for receiving the OFDM-modulated symbol from the transmission source and performing OFDM demodulation of the received OFDM-modulated symbol from a plurality of time points; and a selection means for selecting the demodulation result of the OFDM demodulation to be adopted on the basis of the demodulation results of the OFDM demodulation from the plurality of time points by the demodulation performance means.

Also, an OFDM demodulation device according to the present invention may be described as follows. That is, the present invention provides an OFDM demodulation device that is installed in a transmitting destination to perform OFDM demodulation in a transmission system that transmits data from a transmission source to the transmitting destination through OFDM modulation/demodulation, which includes a demodulation performance means for receiving the OFDM-modulated symbol from the transmission source and performing OFDM demodulation of the received OFDM-modulated symbol from a plurality of time points; a determination means for determining whether or not the demodulation has been normally performed with respect to the OFDM demodulations performed by the demodulation performance means from the plurality of time points; and a result selection means for selecting the demodulation result of the OFDM demodulation which is determined to have been normally performed as the demodulation result of the OFDM demodulation to be adopted by the determination means.

At this time, it is preferable that a time interval for performing the OFDM demodulation performed by the demodulation performance means is a length that is obtained by adding the symbol length and the guard time together in the OFDM modulation. Also, it is preferable that the transmission system is a system that transmits the OFDM-modulated data together with an audio signal by making the OFDM-modulated data overlap the audio signal.

Also, in more detail, an OFDM demodulation device according to the present invention may be described as follows. That is, the present invention provides an OFDM demodulation device, which includes an A/D conversion unit (Analog-Digital conversion unit) for converting an input analog audio signal into a digital signal; a band-pass filter for extracting an OFDM-modulated signal from the digital signal after the conversion; a signal generation unit for generating two signals including a delayed signal that is delayed as long as a total time that is obtained by adding a data symbol length and a guard time with respect to the extracted OFDM-modulated signal and a non-delayed signal from the extracted OFDM-modulated signal; a first demodulation processing unit for performing a demodulation process with respect to the delayed signal; a first parallel-serial conversion unit for converting a parallel transmission bit after the demodulation process performed by the first demodulation processing unit into a single bitstream and outputting the single bitstream as a first received transmission signal; a second demodulation processing unit for performing a demodulation process with respect to the non-delayed signal; a second parallel-serial conversion unit for converting a parallel transmission bit after the demodulation process performed by the second demodulation processing unit into a single bitstream and outputting the single bitstream as a second received transmission signal; a decoding unit for correcting error bits with respect to the first received transmission signal and the second received transmission signal; and a checkup unit for receiving the first received transmission signal and the second received transmission signal corrected by the decoding unit, determining whether or not the demodulation has been normally performed with respect to the first received transmission signal and the second received transmission signal, selecting the demodulation result which is determined to have been normally performed as the demodulation result of the OFDM demodulation to be adopted, and outputting the selected demodulation result as a transmission data signal.

The present invention may be described as follows as an invention of an OFDM modulation/demodulation system including an OFDM modulation device and an OFDM demodulation device.

The present invention provides an OFDM modulation/demodulation system, which includes an OFDM modulation device that is installed in a transmission source to perform OFDM modulation and an OFDM demodulation device that is installed in a transmitting destination to perform OFDM demodulation in a transmission system that transmits data from the transmission source to the transmitting destination through OFDM modulation/demodulation; wherein the OFDM modulation device includes an extension means for extending a symbol period by copying an OFDM-modulated symbol in a predetermined place of the OFDM-modulated symbol for a predetermined length; and a transmission means for transmitting the OFDM-modulated symbol that includes the symbol period extended by the extension means to the transmitting destination; and the OFDM demodulation device includes a demodulation performance means for receiving the OFDM-modulated symbol from the transmission source and performing OFDM demodulation of the received OFDM-modulated symbol from a plurality of time points; and a selection means for selecting the demodulation result of the OFDM demodulation to be adopted on the basis of the demodulation results of the OFDM demodulation performed by the demodulation performance means from the plurality of time points.

Also, in more detail, an OFDM modulation/demodulation system according to the present invention may be described as follows. That is, the present invention provides an OFDM modulation/demodulation system, which includes an OFDM modulation device and an OFDM demodulation device, wherein the OFDM modulation device includes a serial-parallel conversion unit for converting an encoded transmission signal of an input single bitstream into a parallel bitstream; a spectrum envelope amplitude adjustment unit for analyzing a spectrum of an input audio signal and adjusting amplitudes of respective sub-carriers to be modulated based on the analysis result; a data symbol forming unit for modulating the respective sub-carriers after the amplitude adjustment performed by the spectrum envelope amplitude adjustment unit by allocating parallel transmission bits, which have been converted into the parallel bitstream by the serial-parallel conversion unit, as spectrum coefficients of frequencies of the respective sub-carriers and performing an inverse Fourier transform of the parallel transmission bits, and forming a data symbol by synthesizing signals of the respective sub-carriers after modulation; a guard time signal generation unit for generating a guard time signal composed of a guard time and the data symbol by copying a predetermined period of the rear of the data symbol formed by the data symbol forming unit and connecting the copied period to the front of the data symbol as the guard time; a data symbol copy generation unit for extending a symbol period in the guard time signal generated by the guard time signal generation unit by copying the data symbol to be as long as a length that is obtained by adding the guard time and the data symbol length and connecting the copied data symbol to the rear of the corresponding guard time signal; a band-pass filter for removing an OFDM frequency band with respect to the audio signal and outputting the audio signal after removing the OFDM frequency band; an adder for performing synthesis by adding the audio signal after removing the OFDM frequency band by the band-pass filter to the signal in which the symbol period has been extended; and a D/A conversion unit for converting the signal after the synthesis performed by the adder into an analog signal and outputting the analog signal as a synthesized audio signal; and the OFDM demodulation device includes an A/D conversion unit for converting an input analog audio signal into a digital signal; a band-pass filter for extracting an OFDM-modulated signal from the digital signal after the conversion; a signal generation unit for generating two signals including a delayed signal that is delayed as long as a total time that is obtained by adding a data symbol length and a guard time with respect to the extracted OFDM-modulated signal and a non-delayed signal from the extracted OFDM-modulated signal; a first demodulation processing unit for performing a demodulation process with respect to the delayed signal; a first parallel-serial conversion unit for converting a parallel transmission bit after the demodulation process performed by the first demodulation processing unit into a single bitstream and outputting the single bitstream as a first received transmission signal; a second demodulation processing unit for performing a demodulation process with respect to the non-delayed signal; a second parallel-serial conversion unit for converting a parallel transmission bitstream after the demodulation process performed by the second demodulation processing unit into a single bitstream and outputting the single bitstream as a second received transmission signal; a decoding unit for correcting error bits with respect to the first received transmission signal and the second received transmission signal; and a checkup unit for receiving the first received transmission signal and the second received transmission signal corrected by the decoding unit, determining whether or not the demodulation has been normally performed with respect to the first received transmission signal and the second received transmission signal, selecting the demodulation result which is determined to have been normally performed as the demodulation result of the OFDM demodulation to be adopted, and outputting the selected demodulation result as a transmission data signal.

Advantageous Effects of Invention

According to the present invention, it is possible to perform OFDM demodulation without the necessity of symbol synchronization. In particular, the present invention is very effective in a transmission system in which it is difficult to secure the frequency band for symbol synchronization (for example, an audio communication system using an audible sound band).

DESCRIPTION OF EMBODIMENTS

First, the structure of an OFDM symbol to which the present invention is applied will be described. The structure of an OFDM symbol in the related art is shown in (a) of FIG. 1, and the structure of an OFDM symbol to which the present invention is applied is shown in (b) of FIG. 1. As illustrated in (a) of FIG. 1, according to the OFDM symbol in the related art, the rear portion of a data symbol generated by OFDM modulation (a portion surrounded by a dashed line A in (a) of FIG. 1) is copied and added to the front of the data symbol. Here, the added portion becomes a guard interval (GI). The GI is a period for preventing the occurrence of inter-symbol interference in a multi-path environment.

Figure 1A:
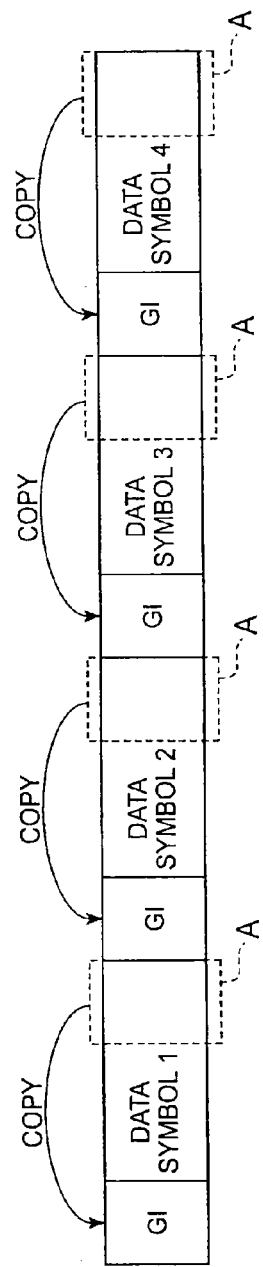
FIG. 1 is a diagram illustrating the structure of an OFDM symbol in the related art and the structure of an OFDM symbol to which the present invention is applied.
Figure 1B:
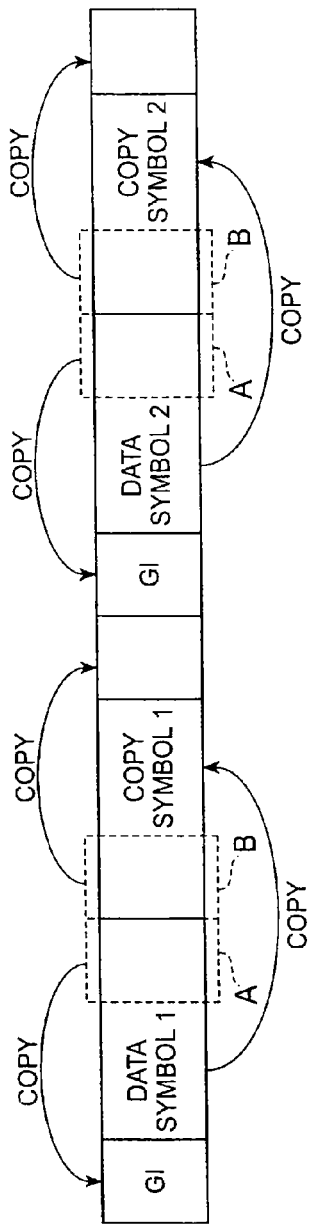

As illustrated in (b) of FIG. 1, according to the OFDM symbol to which the present invention is applied, in the same manner as the GI, the data symbol is also copied onto the rear of the data symbol. As an example, the following process is performed. First, in the same manner as the OFDM symbol in the related art, the rear portion of a data symbol (a portion surrounded by a dashed line A in (b) of FIG. 1) is copied onto the front of the data symbol to be the GI. Next, the whole data symbol is copied and added to the rear of the data symbol. Here, the added portion is called a "copy symbol". Further, a portion having the same length as that of the GI (a portion surrounded by a dashed line B in (b) of FIG. 1) in front of the copy symbol is copied and added to the rear of the corresponding copy symbol. Through the above-described process, the symbol period is extended as long as (GI+data symbol length).

Figure 2:
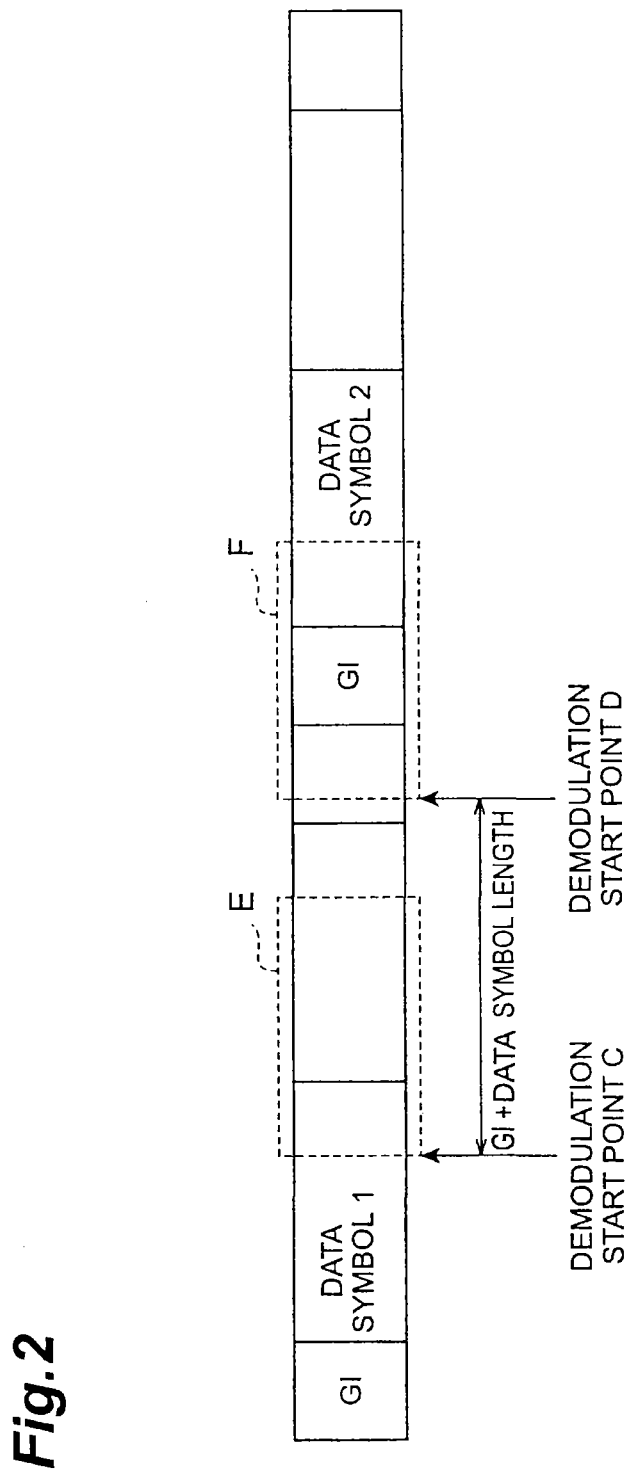
FIG. 2 is a diagram illustrating an example of an OFDM demodulation method in an OFDM symbol structure according to the present invention.

FIG. 2 illustrates an example of an OFDM demodulation method in the OFDM symbol structure according to the present invention. According to the OFDM demodulation in the related art, a boundary between the GI and the data symbol is detected through the symbol synchronization, and the OFDM demodulation is performed at the boundary point. However, according to the present invention, the symbol synchronization is not performed, and thus it may not be possible to detect the boundary between the GI and the data symbol. Accordingly, in the present invention, two points which escape from each other as long as (GI+data symbol length) are optionally selected, and the OFDM demodulation is performed in consideration of the two selected points as demodulation start points. In an example of FIG. 2, points C and D which escape from each other as long as (GI+data symbol length) are selected, and the OFDM demodulation is performed in consideration of the points C and D as the demodulation start points.

By selecting the two demodulation start points C and D which escape from each other as long as (GI+data symbol length) as described above, either of a period E as long as the data symbol length from the demodulation start point C and a period F as long as the data symbol length from the demodulation start point D surely enters into the data symbol period without being put on the frame boundary. In an example of FIG. 2, the period F is put on the frame boundary and thus does not enter into the data symbol period. The period E is not put on the frame boundary and thus enters into the data symbol period. Accordingly, it is possible to perform the OFDM demodulation. As described above, by performing the OFDM demodulation in consideration of the two points which escape from each other as long as (GI+data symbol length) as the demodulation start points and selecting one side having the good demodulation result (for example, the side in which the OFDM demodulation was possible), the OFDM demodulation result in the data symbol period can be surely obtained.

Hereinafter, a transmission system that makes the OFDM-modulated data overlap the audio signal and transmits the OFDM-modulated data together with the audio signal according to an embodiment of the present invention will be described.

The transmission system according to an embodiment of the present invention includes a transmission device 30 (see FIG. 3) that is a transmission source and a reception device 40 (see FIG. 4) that is a transmitting destination.

Figure 3:
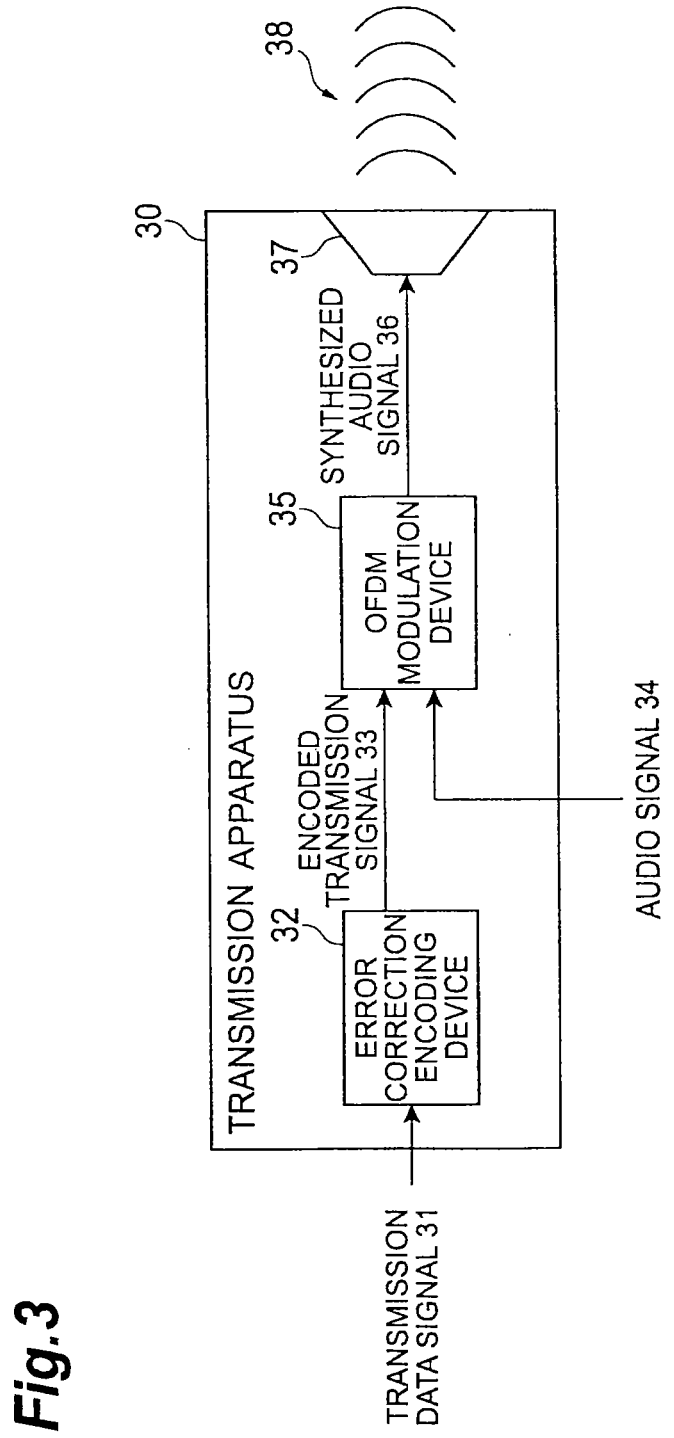
FIG. 3 is a function block diagram of a transmission device.

As illustrated in FIG. 3, the transmission device 30 includes an error correction encoding device 32 encoding an input transmission data signal 31 with an error correction code, an OFDM modulation device 35 (corresponding to the OFDM modulation device according to the present invention) making an encoded transmission signal 33 encoded by the error correction encoding device 32 overlap an input audio signal 34 and generating a synthesized audio signal 36, and a speaker 37 reproducing the synthesized audio signal 36 as a sound wave 38.

Figure 4:
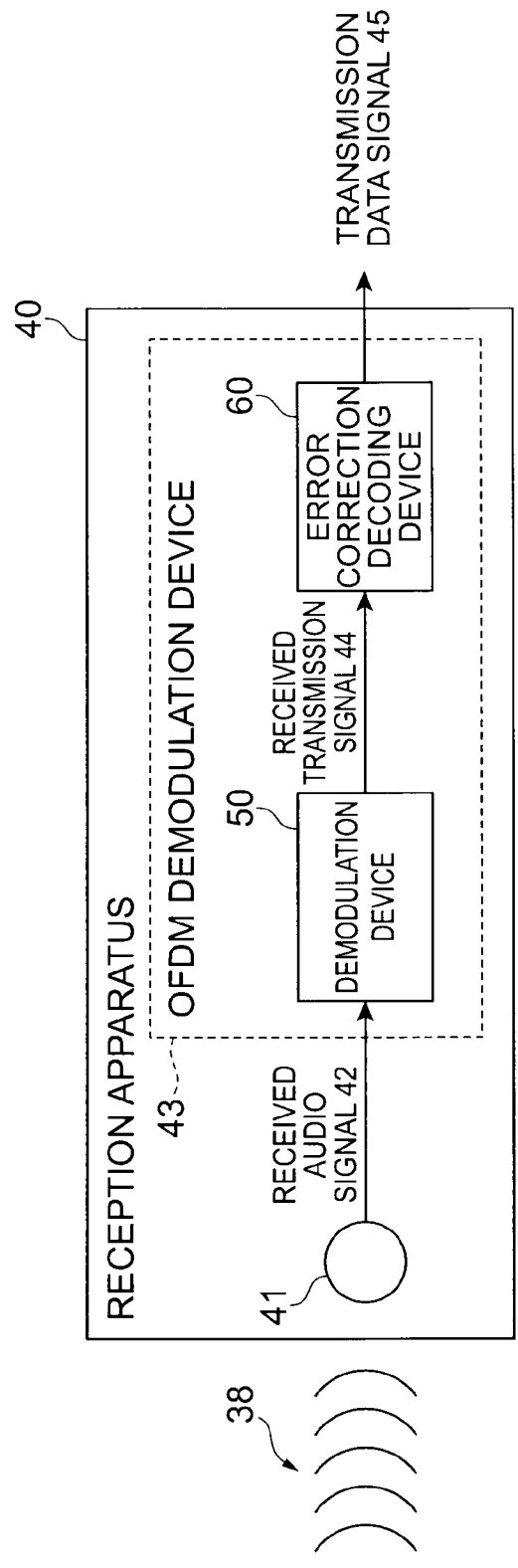
FIG. 4 is a function block diagram of a reception device.

As illustrated in FIG. 4, the reception device 40 includes a microphone 41 receiving the sound wave 38 output from the transmission device 30 and generating a received audio signal 42, a demodulation device 50 demodulating the received audio signal 42 and generating a received transmission signal 44, and an error correction decoding device 60 correcting an error of the received transmission signal 44 and generating and outputting the transmission data signal. In this case, the OFDM demodulation device according to the present invention corresponds to the configuration including the demodulation device 50 and the error correction decoding device 60, i.e. the configuration of the OFDM demodulation device 43 in FIG. 4.

If a system which includes the OFDM modulation device 35 that forms a main portion of the transmission device 30 and the OFDM demodulation device 43 that form a main portion of the reception device 40 is assumed, the system corresponds to the OFDM modulation/demodulation system according to the present invention.

Hereinafter, the function block configuration of the OFDM modulation device 35 and the OFDM demodulation device 43 which constitute the OFDM modulation/demodulation system according to the present invention will be described.

Figure 5:
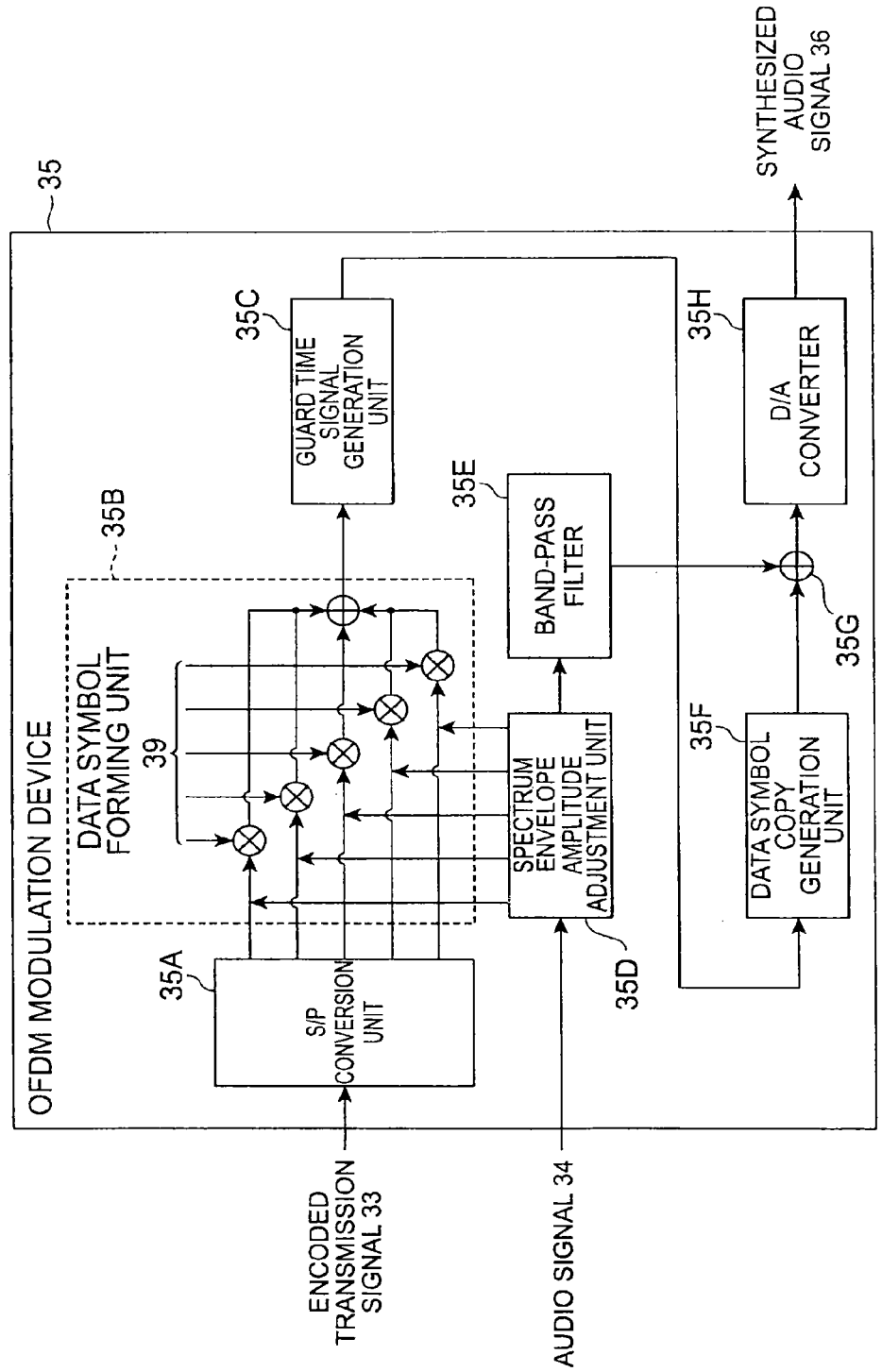
FIG. 5 is a function block diagram of an OFDM modulation device.

As illustrated in FIG. 5, the OFDM modulation device 35 includes a serial-parallel conversion unit (hereinafter referred to as an "S/P conversion unit") 35A for converting an encoded transmission signal 33 of an input single bitstream into a parallel bitstream; a spectrum envelope amplitude adjustment unit 35D for analyzing a spectrum of an input audio signal 34, adjusting amplitudes of respective sub-carriers 39 to be modulated based on the analysis result, and transforming the generated OFDM modulation signal into sound that is close to the audio signal 34; a data symbol forming unit 35B for modulating the respective sub-carriers 39 after the amplitude adjustment performed by the spectrum envelope amplitude adjustment unit 35D by allocating parallel transmission bits, which has been converted into the parallel bitstream by the S/P conversion unit 35A, as spectrum coefficients of frequencies of the respective sub-carriers 39 and performing an inverse Fourier transform of the parallel transmission bits, and forming a data symbol by synthesizing signals of the respective sub-carriers after modulation; a guard time signal generation unit 35C for generating a signal (hereinafter referred to as a "guard time signal") composed of a GI (guard time) and the data symbol by copying a predetermined period of the rear of the data symbol formed by the data symbol forming unit 35B and connecting the copied period to the front of the data symbol as the GI; a data symbol copy generation unit 35F for extending a symbol period in the generated guard time signal by copying the data symbol as long as a length that is obtained by adding the GI and the data symbol length and connecting the copied data symbol to the rear of the corresponding guard time signal; a band-pass filter 35E for receiving the audio signal 34 from the spectrum envelope vibration adjustment unit 35D, removing an OFDM frequency band with respect to the audio signal 34 and outputting the audio signal after removing the OFDM frequency band; an adder 35G for performing synthesis by adding the audio signal after removing the OFDM frequency band by the band-pass filter 35E to the signal in which the symbol period has been extended by the data symbol copy generation unit 35F; and a D/A conversion unit 35H for converting the signal after the synthesis performed by the adder 35G into an analog signal and outputting the analog signal as a synthesized audio signal 36.

Figure 6:
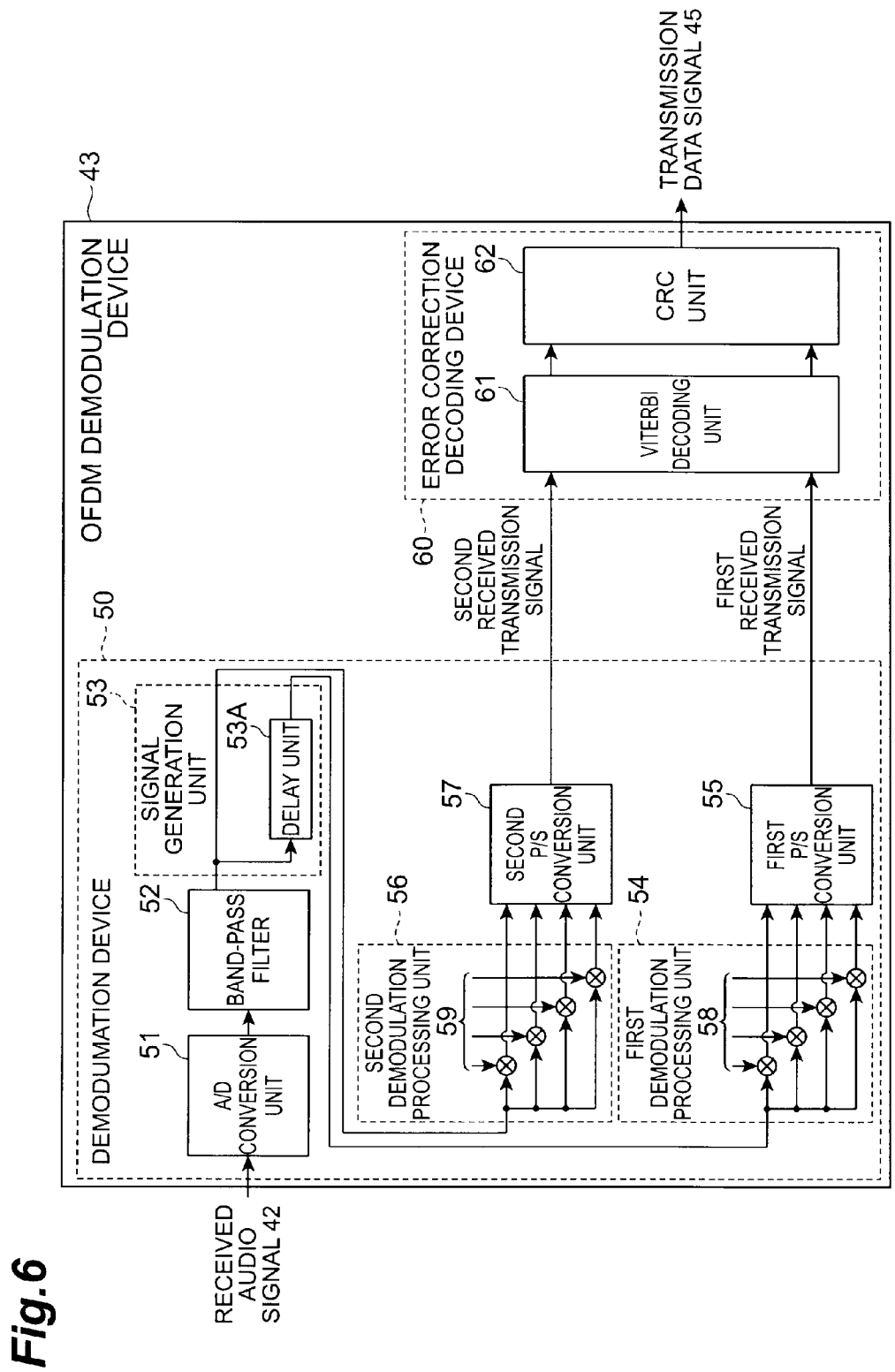
FIG. 6 is a function block diagram of an OFDM demodulation device.
Figure 7:
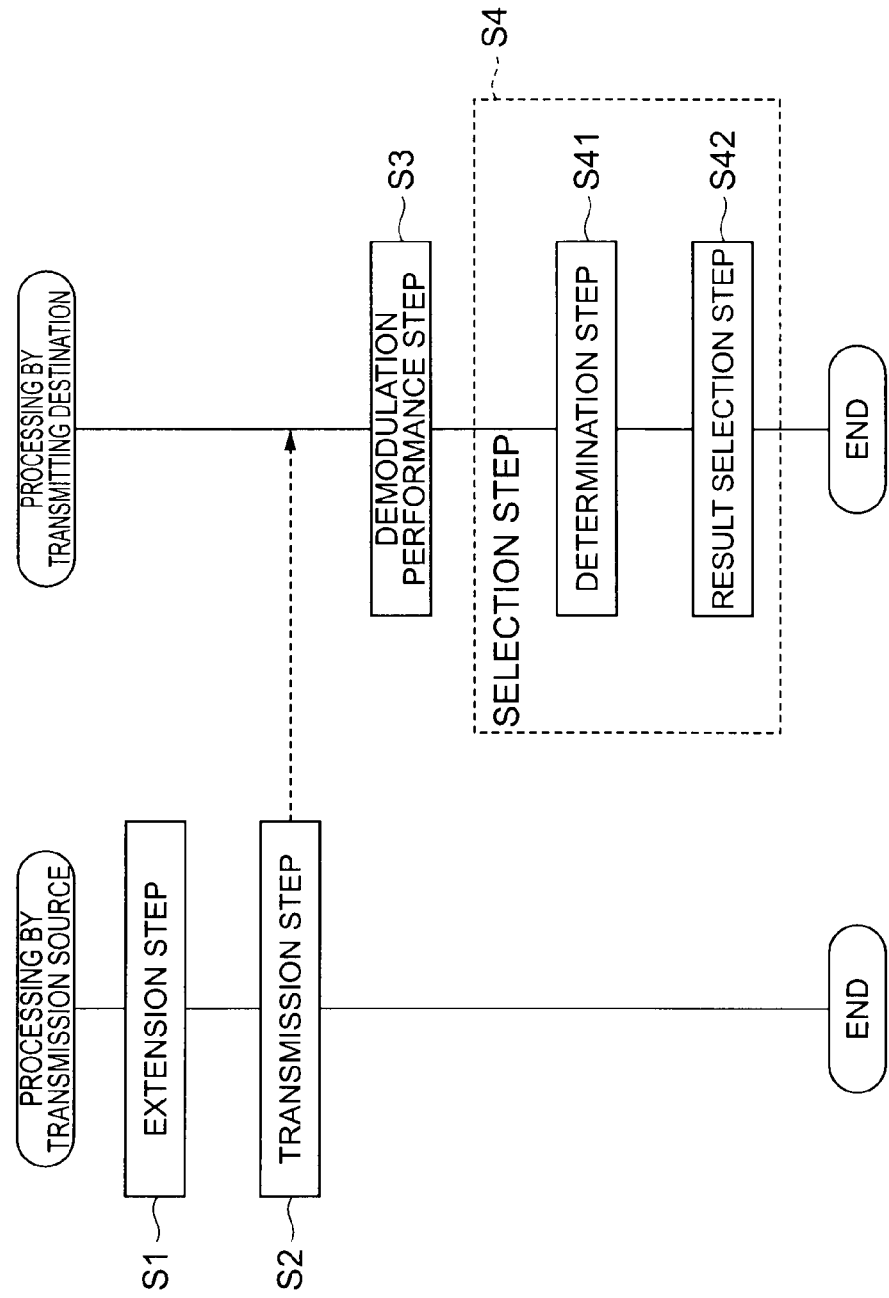
FIG. 7 is a diagram illustrating processing steps of an OFDM modulation/demodulation method according to the present invention.

As illustrated in FIG. 6, the OFDM demodulation device 43 includes a demodulation device 50 and an error correction decoding device 60 as described above. Among them, the demodulation device 50 includes an A/D conversion unit 51 for converting an analog received audio signal 42 received from the microphone 41 (see FIG. 4) into a digital signal; a band-pass filter 52 for extracting an OFDM-modulated signal from the digital signal after the conversion; a signal generation unit 53 for generating two signals including a delayed signal that is delayed as long as a total time that is obtained by adding a data symbol length and the GI with respect to the extracted OFDM-modulated signal and a non-delayed signal from the extracted OFDM-modulated signal; a first demodulation processing unit 54 for performing a demodulation process by sub-carriers 58 with respect to the delayed signal; a first parallel-serial conversion unit (hereinafter referred to as a "first P/S conversion unit") 55 for converting a parallel transmission bit after the demodulation process performed by the first demodulation processing unit 54 into a single bitstream and outputting the single bitstream as a first received transmission signal; a second demodulation processing unit 56 for performing a demodulation process with respect to the non-delayed signal by the subcarriers 59; and a second parallel-serial conversion unit (hereinafter referred to as a "second P/S conversion unit") 57 for converting a parallel transmission bit after the demodulation process performed by the second demodulation processing unit 56 into a single bitstream and outputting the single bitstream as a second received transmission signal. In this case, the signal generation unit 53 has a delay unit 53A that performs delay as long as the total time of the data symbol length and the GI with respect to the OFDM modulation signal.

The error correction decoding device 60 includes a Viterbi decoding unit 61 for correcting error bits based on a Viterbi decoding method with respect to the first received transmission signal and the second received transmission signal, and a CRC (Cyclic Redundancy Check) unit 62 for receiving the first received transmission signal and the second received transmission signal corrected by the Viterbi decoding unit 61, determining whether or not the demodulation has been normally performed with respect to the first received transmission signal and the second received transmission signal, selecting the demodulation result which is determined to have been normally performed as the demodulation result of the OFDM demodulation to be adopted, and outputting the selected demodulation result as a transmission data signal 45.

Hereinafter, the operation of the OFDM modulation device 35 that corresponds to the OFDM modulation device according to the present invention and the OFDM demodulation device 43 that corresponds to the OFDM demodulation device according to the present invention will be described.

In the OFDM modulation device 35 as illustrated in FIG. 5, the S/P conversion unit 35A converts the encoded transmission signal 33 of the input signal bitstream into a parallel bitstream. Also, the spectrum envelope amplitude adjustment unit 35D, in order to transform the generated OFDM-modulated signal into sound that is close to the audio signal 34, analyzes the spectrum of the input audio signal 34, and adjusts the amplitude of the respective sub-carriers 39 to be modulated based on the analysis result. Also, the data symbol forming unit 35B modulates the respective sub-carriers 39 after the amplitude adjustment performed by the spectrum envelope amplitude adjustment unit 35D by allocating the parallel transmission bits which have been transformed into the parallel bitstream by the S/P conversion unit 35A as the spectrum coefficients of the frequencies of the respective subcarriers and performing an inverse Fourier transform of the parallel transmission bits, and forms the data symbol by synthesizing the respective sub-carrier signals after the modulation.

The guard time signal generation unit 35C generates a guard time signal composed of the GI and the data symbol by copying a predetermined period of the rear of the data symbol formed by the data symbol forming unit 35B and connecting the copied period to the front of the data symbol as the GI. Further, the data symbol copy generation unit 35F extends the symbol period in the guard time signal by copying the data symbol as long as the length obtained by adding the GI and the data symbol length with respect to the generated guard time signal and connecting the copied data symbol to the rear of the guard time signal.

Specifically, as illustrated in (b) of FIG. 1, the guard time signal generation unit 35C generates the guard time signal composed of the GI and the data symbol by copying the rear portion of the data symbol (a portion surrounded by the dashed line A in (b) of FIG. 1) in the same manner as the OFDM symbol in the related art and connecting the copied portion to the front of the data symbol as the GI, and the data symbol copy generation unit 35F copies the whole data symbol and adds the copied data symbol to the rear of the data symbol. Further the data symbol copy generation unit 35F copies the portion having the same length as the GI in front of the copy symbol (a portion surrounded by the dashed line B in (b) of FIG. 1) and adds the copied portion to the rear of the corresponding copy symbol. Through the above-described process, the symbol period is extended as long as (GI +data symbol length).

On the other hand, the band-pass filter 35E receives the audio signal 34 from the spectrum envelope amplitude adjustment unit 35D, removes the OFDM frequency band with respect to the audio signal 34, and outputs the audio signal after the removing. Also, the adder 35G performs synthesis by adding the audio signal after the removing performed by the band-pass filter 35E and the signal having the symbol period extended by the data symbol copy generation unit 35F. The D/A conversion unit 35H converts the signal after the addition performed by the adder 35G into an analog signal and outputs the analog signal as the synthesized audio signal 36. The synthesized audio signal 36 is reproduced and output through the speaker 37 of FIG. 3 as the sound wave 38

On the other hand, the band-pass filter 35E receives the audio signal 34 from the spectrum envelop amplitude adjustment unit 35D, removes the OFDM frequency band with respect to the audio signal 34, and outputs the audio signal after the removing. Also, the adder 35G performs synthesis by adding the audio signal after the removing performed by the band-pass filter 35E and the signal having the symbol period extended by the data symbol copy generation unit 35F. The D/A conversion unit 35H converts the signal after the addition performed by the adder 35G into an analog signal and outputs the analog signal as the synthesized audio signal 36. The synthesized audio signal 36 is reproduced and output through the speaker 37 of FIG. 3 as the sound wave 38.

On the other hand, in the reception device 40, the microphone 41 (see FIG. 4) receives the sound wave 38 from the transmission device 30, transforms the corresponding sound wave 38 into an analog received audio signal 42, and output the received audio signal 42 to the OFDM demodulation device 43 illustrated in FIG. 6. In the OFDM demodulation device 43, the A/D conversion unit 51 converts the input received audio signal 42 into a digital signal, and the band-pass filter 52 extracts the OFDM-modulated signal from the digital signal after the conversion. Also, the signal generation unit 53 generates two signals including a delayed signal that is delayed as long as the total time that is obtained by adding the data symbol length and the GI with respect to the extracted OFDM-modulated signal and a non-delayed signal from the extracted OFDM-modulated signal.

The first demodulation processing unit 54 performs a demodulation process with respect to the delayed signal by the sub-carriers 58, and the first P/S conversion unit 55 converts a parallel transmission bit after the demodulation process performed by the first demodulation processing unit 54 into a single bitstream and outputs the single bitstream as the first received transmission signal.

In the same manner, the second demodulation processing unit 56 performs a demodulation process with respect to the non-delayed signal by the sub-carriers 59, and the second P/S conversion unit 57 converts a parallel transmission bitstream after the demodulation process performed by the second demodulation processing unit 56 into a single bitstream and outputs the single bitstream as the second received transmission signal.

If the first received transmission signal and the second received transmission signal are input to the Viterbi decoding unit 61 of the error correction decoding device 60, the Viterbi decoding unit 61 corrects error bits with respect to the first received transmission signal and the second received transmission signal, and the CRC unit 62 receives the first received transmission signal and the second received transmission signal corrected by the Viterbi decoding unit 61, and determines whether or not the demodulation has been normally performed with respect to the first received transmission signal and the second received transmission signal. Here, the CRC unit 62 selects the demodulation result which is determined to have been normally performed as the demodulation result of the OFDM demodulation to be adopted, and outputs the selected demodulation result as the transmission data signal 45.

As described above, in the OFDM demodulation device 43, the first demodulation processing unit 54 and the second demodulation processing unit 56 perform the OFDM demodulation in consideration of two points which escape from each other as long as (GI+data symbol length) as the demodulation start points. As described above using FIG. 2, points C and D which escape from each other as long as (GI+data symbol length) are selected, and the OFDM demodulation is performed in consideration of the points C and D as the demodulation start points. In this case, either of a period E as long as the data symbol length from the demodulation start point C and a period F as long as the data symbol length from the demodulation start point D surely enters into the data symbol period without being put on the frame boundary. In an example of FIG. 2, the period F is put on the frame boundary and does not enter into the data symbol period, but the period E enters into the data symbol period without being put on the frame boundary. Accordingly, it is possible to perform the OFDM demodulation.

As described above, in the OFDM demodulation device 43, by performing the OFDM demodulation in consideration of the two points which escape from each other as long as (GI+data symbol length) as the demodulation start points and selecting one side having the good demodulation result (for example, the side in which the OFDM demodulation was possible), the OFDM demodulation result in the data symbol period can be surely obtained. That is, it is possible to perform the OFDM demodulation without the necessity of symbol synchronization.

In the above-described embodiment, it is exemplified that in the OFDM modulation device, the length for extending the data symbol is set to (GI+data symbol length), and in the OFDM demodulation device, the OFDM demodulation is performed in consideration of the two points which escape from each other as long as (GI+data symbol length) as the demodulation start points. However, the present invention is not limited thereto. For example, in the OFDM modulation device, the length for extending the data symbol may be set to ((GI+data symbol length)/2), and in the OFDM demodulation device, the OFDM demodulation may be performed in consideration of three points which escape from each other as long as ((GI+data symbol length)/2) as the demodulation start points. In this case, since any one of the OFDM demodulations in consideration of the three points as the demodulation start point is normally performed, the OFDM demodulation result in the data symbol period can be surely obtained through selection of the demodulation result in which the OFDM demodulation is possible. That is, it is possible to perform the OFDM demodulation without the necessity of symbol synchronization.

Figure 8:
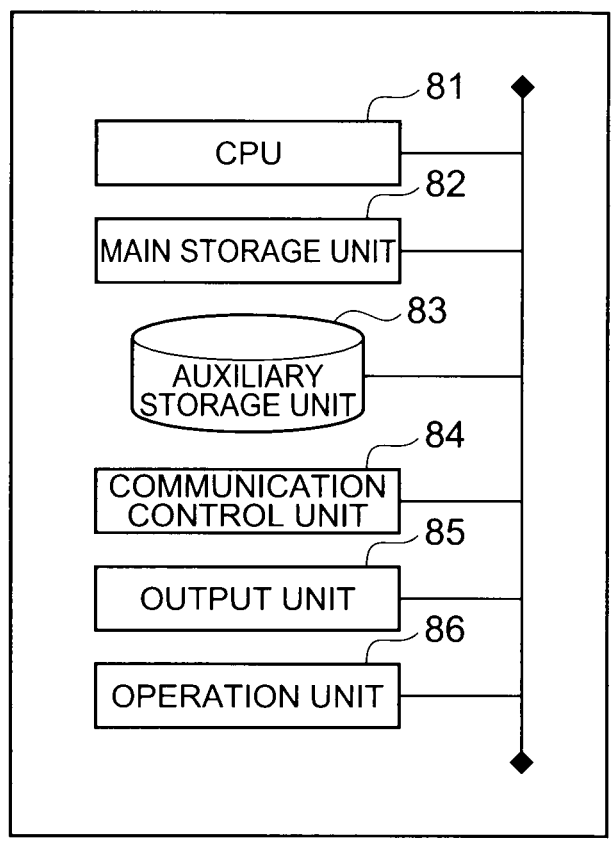
FIG. 8 is a hardware configuration diagram of respective devices.

In the meantime, the respective devices as illustrated in FIGS. 3 and 4 (the error correction encoding device 32, the OFDM modulation device 35, the demodulation device 50, and the error correction decoding device 60) have the configuration, for example, as illustrated in FIG. 8 from the view point of hardware. That is, the respective devices may be configured to include: a CPU 81 executing an operating system, an application program and the like; a main storage unit 82 composed of a ROM and a RAM; an auxiliary storage unit 83 composed of a nonvolatile memory and the like; a communication control unit 84 for controlling signal exchange with other devices; an output unit 85 for performing information display, information print output and the like; and an operation unit 86 composed of keys for performing character and numeral input and execution instruction. Also, in another aspect, the whole OFDM demodulation device 43 including the decoding device 50 and the error correction decoding device 60 may be configured as one device having the hardware configuration of FIG. 8 from the viewpoint of hardware. Also, in still another aspect, the whole transmission device 30 may be configured as one device having the hardware configuration of FIG. 8, and the whole reception device 40 may be configured as one device having the hardware configuration of FIG. 8.

REFERENCE SIGNS LIST

30: Transmission Device
31: Transmission Data Signal
32: Error Correction Encoding Device
33: Encoded Transmission Signal
34: Audio Signal
35: OFDM Modulation Device
35A: S/P Conversion Unit
35B: Data Symbol Forming Unit
35C: Guard Time Signal Generation Unit
35D: Spectrum Envelope Amplitude Adjustment Unit
35E: Band-Pass Filter
35F: Data Symbol Copy Generation Unit
35G: Adder
35H: D/A Conversion Unit
36: Synthesized Audio Signal
37: Speaker
38: Sound Wave
39: Sub-Carrier
40: Reception Device
41: Microphone
42: Received Audio Signal
43: OFDM Demodulation Device
44: Received Transmission Signal
45: Transmission Data Signal
50: Demodulation Device
51: A/D Conversion Unit
52: Band-Pass Filter
53: Signal Generation Unit
53A: Delay Unit
54: First Demodulation Processing Unit
55: First P/S Conversion Unit
56: Second Demodulation Processing Unit
57: Second P/S Conversion Unit
58, 59: Sub-Carrier
60: Error Correction Decoding Device
61: Viterbi Decoding Unit
62: CRC Unit
81: CPU
82: Main Storage Unit
83: Auxiliary Storage Unit
84: Communication Control Unit
85: Output Unit
86: Operation Unit

The invention claimed is:

1. An OFDM modulation/demodulation method in a transmission system that transmits data from a transmission source to a transmitting destination through OFDM modulation/demodulation, comprising:
an extension step of extending, by the transmission source, a symbol period by adding a copy symbol generated by copying an OFDM-modulated data symbol to an end of the data symbol, and adding guard intervals in the OFDM modulation to a front of the data symbol and a rear of the copy symbol;
a transmission step of transmitting, by the transmission source, an OFDM-modulated symbol that includes the extended symbol period to the transmitting destination;
a demodulation performance step of receiving, by the transmitting destination, the OFDM-modulated symbol from the transmission source and performing OFDM demodulation of the received OFDM-modulated symbol from two time points with an interval corresponding to a length that is obtained by adding a symbol length of the data symbol in the OFDM modulation and a guard time of one of the guard intervals in the OFDM modulation; and
a selection step of selecting, by the transmitting destination, a demodulation result of the OFDM demodulation to be adopted on the basis of demodulation results of the OFDM demodulation from the two time points.

2. The OFDM modulation/demodulation method according to claim 1, wherein the transmission system is a system that transmits the OFDM-modulated data together with an audio signal by making the OFDM-modulated data overlap the audio signal.

3. An OFDM modulation/demodulation method in a transmission system that transmits data from a transmission source to a transmitting destination through OFDM modulation/demodulation, comprising:
an extension step of extending, by the transmission source, a symbol period by adding a copy symbol generated by copying an OFDM-modulated data symbol to an end of the data symbol, and adding guard intervals in the OFDM modulation to a front of the data symbol and a rear of the copy symbol;
a transmission step of transmitting, by the transmission source, an OFDM-modulated symbol that includes the extended symbol period to the transmitting destination;
a demodulation performance step of receiving, by the transmitting destination, the OFDM-modulated symbol from the transmission source and performing OFDM demodulation of the received OFDM-modulated symbol from two time points with an interval corresponding to a length that is obtained by adding a symbol length of the data symbol in the OFDM modulation and a guard time of one of the guard intervals in the OFDM modulation;
a determination step of correcting error bits and determining, by the transmitting destination, whether or not the demodulation has been normally performed with respect to the OFDM demodulations from the two time points on the basis of a corrected result; and
a result selection step of selecting, by the transmitting destination, a demodulation result of the OFDM demodulation which is determined to have been normally performed as the demodulation result of the OFDM demodulation to be adopted.

4. The OFDM modulation/demodulation method according to claim 3, wherein the transmission system is a system that transmits the OFDM-modulated data together with an audio signal by making the OFDM-modulated data overlap the audio signal.

5. An OFDM modulation/demodulation system that transmits data from a transmission source to a transmitting destination through OFDM modulation/demodulation, comprising:
an OFDM modulation device that is installed in the transmission source to perform OFDM modulation; and an OFDM demodulation device that is installed in the transmitting destination to perform OFDM demodulation;
wherein the OFDM modulation device includes:
an extension unit that extends a symbol period by adding a copy symbol generated by copying an OFDM-modulated data symbol to an end of the data symbol, and adding guard intervals in the OFDM modulation to a front of the data symbol and a rear of the copy symbol; and a transmission unit for transmitting an OFDM-modulated symbol that includes the symbol period extended by the extension unit to the transmitting destination; and wherein the OFDM demodulation device includes:
a demodulation performance unit that receives the OFDM-modulated symbol from the transmission source and performs OFDM demodulation with respect to the received OFDM-modulated symbol from two time points with an interval corresponding to a length that is obtained by adding a symbol length of the data symbol in the OFDM modulation and a guard time of one of the guard intervals in the OFDM modulation; and
a selection unit that selects a demodulation result of the OFDM demodulation to be adopted on the basis of demodulation results of the OFDM demodulation performed by the demodulation performance unit from the two time points.

6. An OFDM modulation/demodulation system that transmits data from a transmission source to a transmitting destination through OFDM modulation/demodulation, comprising:

an OFDM modulation device that is installed in the transmission source to perform OFDM modulation; and an OFDM demodulation device that is installed in the transmitting destination to perform OFDM demodulation;

wherein the OFDM modulation device includes:
an extension unit that extends a symbol period by adding a copy symbol generated by copying an OFDM-modulated data symbol to an end of the data symbol, and adding guard intervals in the OFDM modulation to a front of the data symbol and a rear of the copy symbol;
a transmission unit that transmits an OFDM-modulated symbol that includes the extended symbol period to the transmitting destination;

wherein the OFDM demodulation device includes:
a demodulation performance unit that receives the OFDM-modulated symbol from the transmission source and performs OFDM demodulation of the received OFDM-modulated symbol from two time points with an interval corresponding to a length that is obtained by adding a symbol length of the data symbol in the OFDM modulation and a guard time of one of the guard intervals in the OFDM modulation;
a determination unit that corrects error bits and determines whether or not the demodulation has been normally performed with respect to the OFDM demodulations from the two time points on the basis of a corrected result; and
a result selection unit that selects a demodulation result of the OFDM demodulation which is determined to have been normally performed as the demodulation result of the OFDM demodulation to be adopted.

* * * * *